(12) United States Patent
Muldoon et al.

(10) Patent No.: US 12,123,373 B2
(45) Date of Patent: Oct. 22, 2024

(54) GEARED TURBOFAN WITH OVER-SPEED PROTECTION

(71) Applicant: Raytheon Technologies Corporation, Farmington, CT (US)

(72) Inventors: Marc J. Muldoon, Marlborough, CT (US); Michael E. McCune, Colchester, CT (US); Andrew J. Murphy, Old Saybrook, CT (US)

(73) Assignee: RTX Corporation, Farmington, CT (US)

( * ) Notice: Subject to any disclaimer, the term of this patent is extended or adjusted under 35 U.S.C. 154(b) by 566 days.

(21) Appl. No.: 16/931,685

(22) Filed: Jul. 17, 2020

(65) Prior Publication Data

US 2022/0018311 A1     Jan. 20, 2022

(51) Int. Cl.
*F02C 7/36* (2006.01)
*F02K 3/06* (2006.01)

(52) U.S. Cl.
CPC .................. *F02K 3/06* (2013.01); *F02C 7/36* (2013.01); *F05D 2220/323* (2013.01); *F05D 2220/36* (2013.01); *F05D 2240/35* (2013.01); *F05D 2240/60* (2013.01); *F05D 2260/40311* (2013.01)

(58) Field of Classification Search
CPC ........... F02K 3/06; F02C 7/36; F05D 2240/60
See application file for complete search history.

(56) References Cited

U.S. PATENT DOCUMENTS

| 3,792,586 A | * | 2/1974 | Kasmarik | F02K 3/06 60/39.08 |
| 3,830,058 A | * | 8/1974 | Ainsworth | F02C 7/20 244/54 |
| 6,672,049 B2 | * | 1/2004 | Franchet | F02K 3/06 60/39.162 |
| 7,997,085 B2 | | 8/2011 | Moniz et al. | |

(Continued)

FOREIGN PATENT DOCUMENTS

EP     3575573     12/2019

OTHER PUBLICATIONS

EP Search Report for EP Application No. 21186237.0 dated Nov. 30, 2021.

(Continued)

*Primary Examiner* — Lorne E Meade
(74) *Attorney, Agent, or Firm* — Carlson, Gaskey & Olds, P.C.

(57) ABSTRACT

A gas turbine engine includes a fan shaft rotatable about an axis, a fan connected to the fan shaft, and an outer housing surrounding the fan to define a bypass passage. A compressor section has both a low pressure compressor that is fixed to rotate with the fan shaft and a high pressure compressor. A turbine section has a low pressure turbine driving a low speed spool and a high pressure turbine driving the high pressure compressor. The low pressure turbine includes rotating blades and a static structure aft of the rotating blades. A fan drivetrain includes a geared architecture connecting the low speed spool to the fan shaft such that the fan and low pressure compressor rotate at a lower speed than the (Continued)

low pressure turbine. A thrust bearing is axially aft of the geared architecture and axially forward of the high pressure compressor. A tower shaft is rotatably driven by the low speed spool.

2 Claims, 2 Drawing Sheets

(56) References Cited

U.S. PATENT DOCUMENTS

| | | | | |
|---|---|---|---|---|
| 8,333,554 | B2* | 12/2012 | Chaudhry | F02C 7/36 |
| | | | | 415/122.1 |
| 8,621,871 | B2* | 1/2014 | McCune | F01D 25/16 |
| | | | | 60/226.1 |
| 10,612,555 | B2 | 4/2020 | Sheridan et al. | |
| 2008/0098718 | A1 | 5/2008 | Henry | |
| 2013/0186058 | A1* | 7/2013 | Sheridan | F02K 3/06 |
| | | | | 60/226.1 |
| 2016/0178464 | A1* | 6/2016 | Burns | F02C 3/10 |
| | | | | 73/112.01 |
| 2016/0251977 | A1 | 9/2016 | Gates et al. | |
| 2018/0223739 | A1 | 8/2018 | Dubreuil et al. | |
| 2019/0368424 | A1 | 12/2019 | Kupratis | |

OTHER PUBLICATIONS

European Search Report for European Patent Application No. 24170636.5 completed on Jun. 21, 2024.

* cited by examiner

GEARED TURBOFAN WITH OVER-SPEED PROTECTION

BACKGROUND

This disclosure relates generally to providing over-speed protection for a geared turbofan wherein a low pressure spool drives a fan and low pressure compressor through a gear reduction.

Gas turbine engines can include a fan section, a compressor section, a combustor section and a turbine section. The fan section includes a fan having fan blades for compressing a portion of incoming air to produce thrust and also for delivering a portion of air to the compressor section. Air entering the compressor section is compressed and delivered into the combustor section where it is mixed with fuel and ignited to generate a high-speed exhaust gas flow. The high-speed exhaust gas flow expands through the turbine section to drive the compressor section and the fan.

The design of gas turbine engines must consider component failure conditions and their systemic effects. A low pressure turbine over-speed condition may exist when, in the event of a component failure, the low pressure turbine becomes decoupled from any load while continuing to be driven by the products of combustion and rotating freely. In this condition, the turbine may accelerates beyond its maximum design speed, which would be undesirable.

Historically, the fan section of gas turbine engines rotated as one with the fan drive turbine. This resulted in compromise in the design, as it may be desirable to have the turbine rotate at a higher speed than the fan. Thus, more recently a gear reduction has been included between the fan drive turbine and the fan section.

It has also been proposed to place the gear reduction between the fan drive turbine and low pressure compressor section, such that the fan and low pressure compressor are driven at the same speed. Applicant has realized such an arrangement raises turbine over-speed challenges in the event of a failure in the fan drivetrain.

SUMMARY

In a featured embodiment, a gas turbine engine includes a fan shaft rotatable about an axis, a fan connected to the fan shaft, and an outer housing surrounding the fan to define a bypass passage. A compressor section has both a low pressure compressor that is fixed to rotate with the fan shaft and a high pressure compressor. A turbine section has a low pressure turbine driving a low speed spool and a high pressure turbine driving the high pressure compressor. The low pressure turbine includes rotating blades and a static structure aft of the rotating blades. A fan drivetrain includes a geared architecture connecting the low speed spool to the fan shaft such that the fan and low pressure compressor rotate at a lower speed than the low pressure turbine. A thrust bearing is axially aft of the geared architecture and axially forward of the high pressure compressor. A tower shaft is rotatably driven by the low speed spool.

In another embodiment according to the previous embodiment, the thrust bearing is aft-loaded such that the low pressure turbine blades will shift axially aft in the event of a fan drivetrain failure at a location axially aft of the thrust bearing.

In another embodiment according to any of the previous embodiments, the thrust bearing maintains the low speed spool axially in place in the event of a fan drivetrain failure at a location axially forward of the thrust bearing.

In another embodiment according to any of the previous embodiments, the low speed spool includes a low speed shaft section mounting the low pressure turbine and an input shaft section axially forward of the thrust bearing and driving the geared architecture. The low speed shaft section and input shaft section include separate components fixed to rotate together.

In another embodiment according to any of the previous embodiments, the tower shaft provides a counter-load on the low speed spool in the event of a fan drivetrain failure at a location axially forward of the thrust bearing.

In another embodiment according to any of the previous embodiments, the thrust bearing is aft-loaded such that the low pressure turbine blades will shift axially aft in the event of a fan drivetrain failure at a location axially aft of the thrust bearing.

In another embodiment according to any of the previous embodiments, the tower shaft connects to the low pressure spool at a location axially aft of the thrust bearing.

In another embodiment according to any of the previous embodiments, the tower shaft connects to the low pressure spool at a location axially forward of the high pressure compressor.

In another embodiment according to any of the previous embodiments, there is at least one sensor for detecting a fan drivetrain failure event and communicating to a control.

In another embodiment according to any of the previous embodiments, the control initiates a fuel shutoff procedure if the fan drivetrain failure event is detected.

In another embodiment according to any of the previous embodiments, the control activates a braking mechanism to resist rotation of the low speed spool if the fan drivetrain failure event is detected.

In another embodiment according to any of the previous embodiments, the braking mechanism is directly connected to the low speed spool.

In another embodiment according to any of the previous embodiments, the braking mechanism is directly connected to the tower shaft.

In another embodiment according to any of the previous embodiments, the braking mechanism is included in an engine accessory component driven by the tower shaft.

In another embodiment according to any of the previous embodiments, the tower shaft drives an engine accessory component.

In another embodiment according to any of the previous embodiments, the engine accessory component is a generator which delivers electrical power to an associated aircraft.

In another featured embodiment, a gas turbine engine includes a fan shaft rotatable about an axis, a fan connected to the fan shaft, and an outer housing surrounding the fan to define a bypass passage. A compressor section has both a low pressure compressor that is fixed to rotate with the fan shaft and a high pressure compressor. A turbine section has a low pressure turbine driving a low speed spool and a high pressure turbine driving the high pressure compressor. A fan drivetrain includes a geared architecture connecting the low speed spool to the fan shaft such that the fan and low pressure compressor rotate at a lower speed than the low pressure turbine. A tower shaft is rotatably driven by the low speed spool.

In another embodiment according to any of the previous embodiments, at least one sensor detects a fan drivetrain failure event and communicating to a control. The control initiates a fuel shutoff procedure if the fan drivetrain failure event is detected.

In another embodiment according to any of the previous embodiments, the control activates a braking mechanism to resist rotation of the tower shaft if the fan drivetrain failure event is detected.

In another featured embodiment, a gas turbine engine includes a fan shaft rotatable about an axis, a fan connected to the fan shaft, and an outer housing surrounding the fan to define a bypass passage. A compressor section has both a low pressure compressor that is fixed to rotate with the fan shaft and a high pressure compressor. A turbine section has a low pressure turbine driving a low speed spool and a high pressure turbine driving the high pressure compressor. The low pressure turbine includes rotating blades and a static structure aft of the rotating blades. A fan drivetrain includes a geared architecture connecting the low speed spool to the fan shaft such that the fan and low pressure compressor rotate at a lower speed than the low pressure turbine. An aft-loaded thrust bearing axially aft of the gear architecture and forward of the high pressure compressor. A tower shaft is rotatably driven by the low speed spool at a location axially aft of the thrust bearing and forward of the high pressure compressor. The tower shaft rotatably drives an engine accessory component and engaging with a braking mechanism. At least one sensor detects a fan drivetrain failure event and communicating to a control. The control initiates a fuel shutoff procedure and activates the braking mechanism if the fan drivetrain failure event is detected.

DETAILED DESCRIPTION

Figure 1:
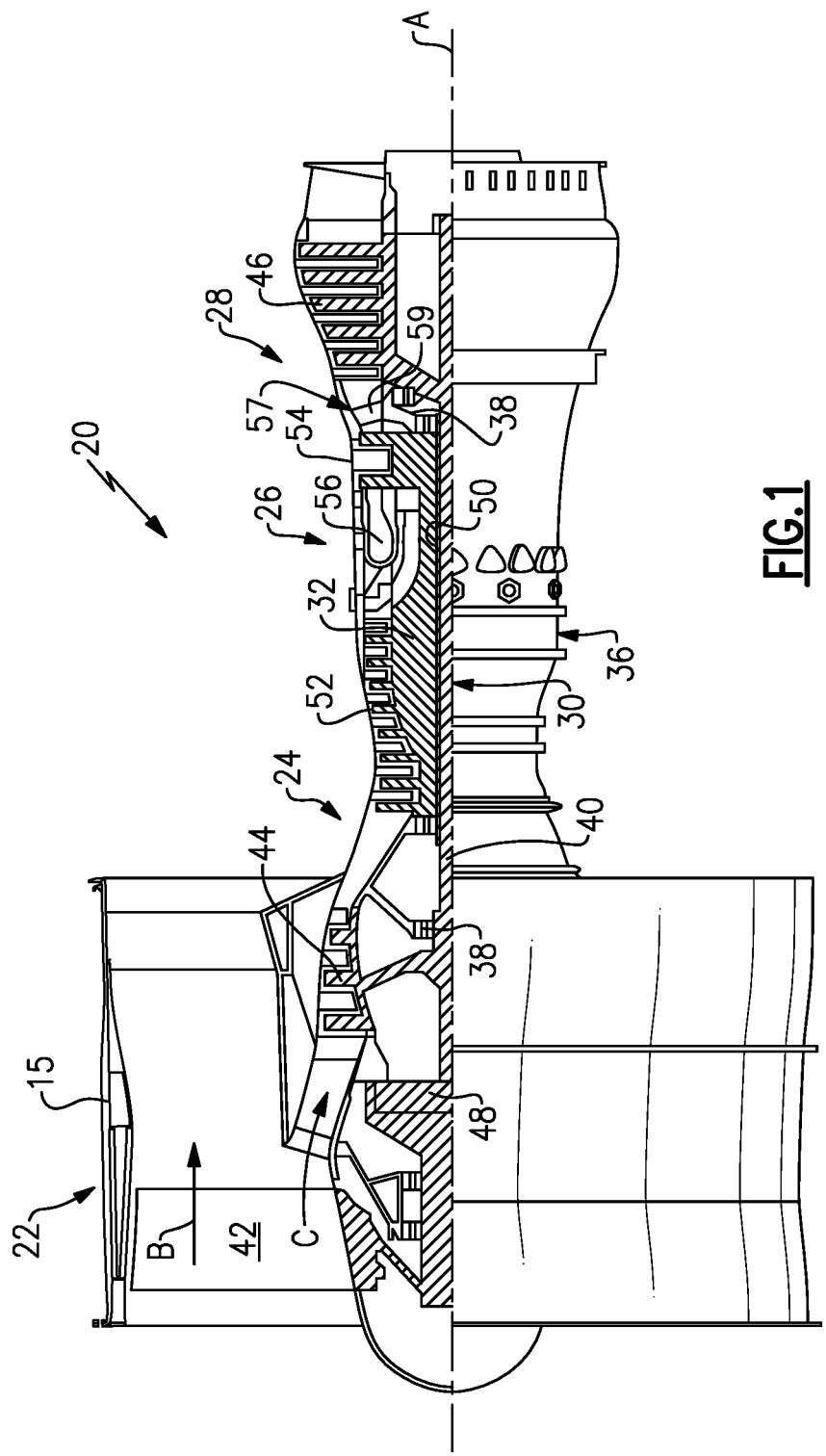
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), or greater than thirteen (13), the geared architecture 48 is an epicyclic gear train, such as a planetary gear system or other gear system, with a gear reduction ratio of greater than about 2.3, or greater and 3.0, and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is measured as the pressure prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
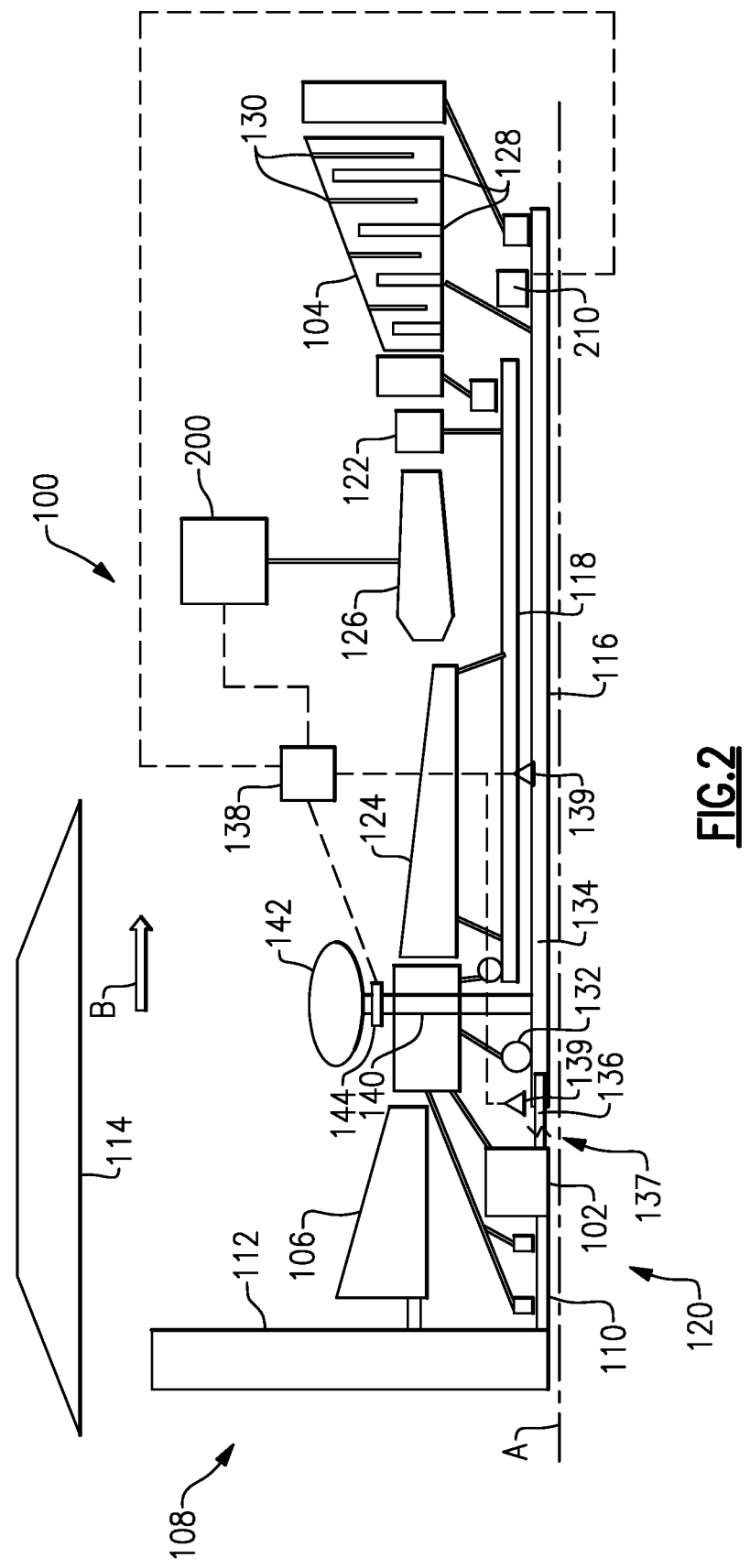
FIG. 2 illustrates a second gas turbine engine.

FIG. 2 schematically illustrates a geared engine embodiment 100 wherein a gear reduction 102 is positioned between a low pressure turbine or fan drive turbine 104 and a low pressure compressor 106 such that the low pressure compressor 106 and a fan section 108 are driven to rotate together at a lower speed than the low pressure turbine 104. The fan section 108 includes a fan shaft 110, a fan 112 connected the fan shaft 110, and an outer housing 114 surrounding the fan 112 to define a bypass passage B. Engine 100 includes a low speed spool 116 and a high speed spool 118 mounted for rotation about an engine central longitudinal axis A. The low speed spool 116 includes the low pressure turbine 104 and drives the gear reduction 102 to, in turn, drive fan shaft 110, these rotatably connected components defining a fan drivetrain 120. The fan 112 and the low pressure compressor 106 are fixed to rotate with the fan shaft 110. The connection between fan 112 and the low pressure compressor 106 is shown schematically. In fact, they may be separately secured to fan shaft 110. The high speed spool 118 includes a high pressure turbine 122 driving a high pressure compressor 124. A combustor 126 is intermediate the high pressure compressor 124 and the high pressure turbine 122. The operation, performance quantities, and other details mentioned above with regard to engine 20 also apply to engine 100.

Low pressure turbine 104 further includes rotating blades 128 and a static structure 130 at a position aft of the rotating blades 128. In one embodiment, the static structure 130 includes vanes of the low pressure turbine 104.

A thrust bearing 132 is located axially between the low pressure compressor 106 and high pressure compressor 124. Thrust bearing 132 is loaded in an axially aft direction and keeps the low speed spool 116 axially in place during normal operation.

The low speed spool 116 may comprise a low speed shaft section 134 mounting the low pressure turbine 104 and an input shaft section 136 as an input driving the gear reduction 102. The input shaft section 136 is located axially forward of thrust bearing 132. The low speed shaft section 134 and input shaft section 136 may be separate components fixed to rotate together. Alternatively, sections 134 and 136 may be a single part. In another embodiment input shaft section 136 may be flexible relative to low speed shaft section 134.

Engine 100 also includes over-speed protection of the low pressure turbine 104 in the event of a component failure 137 in the fan drivetrain 120. Engine 20 includes a control 138 and sensors 139. The sensors 139 detect the occurrence of a component failure 137 in the fan drive train 120 and transmit this information to the control 138. Component failure 137 is illustrated as a failure on input shaft section 136, axially forward of thrust bearing 132. However, it should be understood that component failure 137 could occur at any location and component of the fan drivetrain 120, including on the low speed spool 116, within the gear reduction 102, or on the fan shaft 110. Component failure 137 may be a shearing of the rotating component, but may also include fractures, deflection, buckling, or other mechanical failures causing a decoupling of the component from the drivetrain.

The control 138 initiates a fuel shut-off procedure when it receives information that any such component failure 137 has occurred. As an example, control 138 is shown communicating with a fuel pump 200 to achieve the fuel shut-off. Control 138 may be incorporated into a full authority digital engine control (FADEC) or may be a stand-alone control. When the fuel shut-off procedure is executed, fuel delivery to the combustor 126 is terminated and combustion products cease to expand across and accelerate the low pressure turbine 104. However, there is some amount of time delay between the occurrence of component failure 137 and the execution of the fuel shut-off procedure.

Should the fan drivetrain 120 fail at a location aft of thrust bearing 132, then the absence of the thrust bearing 132 load will shift the rotating blades 128 axially aft to clash with the static structure 130, thereby preventing a turbine over-speed condition in the time it takes to execute the fuel shut-off procedure. However, in the event of a failure of the fan drivetrain 120 forward of the thrust bearing 132, the low pressure turbine 104 will remain axially in place. Accordingly, to provide an over-speed mitigating counter-load on low pressure turbine 104 in this event, as well as to provide other benefits that will be described below, engine 100 is provided with a tower shaft 140 which is rotatably connected to the low speed spool 116.

Note that in an engine like the one illustrated in FIG. 1, a failure forward to the low pressure compressor will result in the fan drive turbine having the counter-load of the low pressure compressor to provide over-speed mitigation. This is not the case with the engine 100.

The tower shaft 140 is connected to the low speed spool 116 at a location axially aft of thrust bearing 132 and extends out from the low speed spool 116 in an at least partially circumferential direction. In one embodiment, the tower shaft 140 is connected to the low speed spool 116 at a location axially forward of the high-pressure compressor 124. However, tower shaft 140 may also be connected at other locations, such as axially between the high pressure compressor 124 and the combustor 126, between the combustor 126 and high pressure turbine 122, between the high pressure turbine 122 and low pressure turbine 104, or axially aft of the low pressure turbine 104. The low speed spool 116 drives the tower shaft 140 to rotate. In the event of a component failure in the fan drivetrain 120 forward of thrust bearing 132, the tower shaft 140 is configured to provide a counter-load to mitigate the low pressure turbine 104 reaching an over-speed condition in the time it takes to execute the fuel shut-off procedure.

In one embodiment, the tower shaft 140 drives an engine accessory component 142. In one embodiment, the engine accessory component 142 is a generator turning the rotation of the tower shaft 140 into electrical energy and delivering this energy to an associated aircraft mounting the engine 100. The engine accessory component 142 may be any other type of engine accessory providing a sufficient counter-load, such as a fuel pump, a lubricating oil pump delivering lubrication to the gear reduction 102 or elsewhere, a high pressure air compressor for aircraft undercarriage actuation, a low pressure air compressor for aircraft cabin environmental control, or an engine starter.

The tower shaft 140 may also be connected to a braking mechanism 144 such as a hydraulic or spring-activated clutch. In one embodiment, the control 138 activates the braking mechanism 144 when a failure in the fan drivetrain 120 is detected. In another embodiment, the control 138 may activate the braking mechanism 144 if the low pressure turbine 104 reaches a speed above a predetermined threshold. The braking mechanism 144 may be directly connected to the tower shaft 140, or integrated in the engine accessory component 142 driven by the tower shaft 140. Alternatively, a braking mechanism 210 may mounted directly on the low speed spool 116. Activation of the braking mechanism 144 increases the counter-load that the tower shaft 140 applies on the low speed spool 116 to resist rotation and further slow or stop the low pressure turbine 104 during a fan drivetrain failure event. The event in this case is loss of torque at any point axially forward of the thrust bearing 132, including the input shaft section 136, the gear reduction 102, or the fan shaft 110.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
    a fan shaft rotatable about an axis, a fan connected to said fan shaft, and an outer housing surrounding the fan to define a bypass passage;
    a compressor section having both a low pressure compressor that is fixed to rotate with the fan shaft and a high pressure compressor;
    a turbine section having a low pressure turbine driving a low speed spool and a high pressure turbine driving the high pressure compressor;
    a fan drivetrain including a geared architecture connecting the low speed spool to the fan shaft such that the fan and low pressure compressor rotate at a lower speed than the low pressure turbine;
    a tower shaft rotatably driven by the low speed spool; and
    a braking mechanism, wherein activation of the braking mechanism applies a force resisting rotation of the tower shaft.

2. The gas turbine engine of claim 1, further comprising at least one sensor for detecting a fan drivetrain failure event and communicating to a control, wherein the control initiates a fuel shutoff procedure if the fan drivetrain failure event is detected.

* * * * *